United States Patent [19]

Pilatos

[11] Patent Number: 5,659,655

[45] Date of Patent: Aug. 19, 1997

[54] OPTICAL RIBBON CABLE FANOUT BOXES

[75] Inventor: John C. Pilatos, Long Beach, Calif.

[73] Assignee: McDonnell Douglas Corporation, Huntington Beach, Calif.

[21] Appl. No.: 646,760

[22] Filed: Apr. 29, 1996

[51] Int. Cl.$^6$ .................................................. G02B 6/00
[52] U.S. Cl. ........................................................ 385/136
[58] Field of Search ............................ 385/88, 89, 92, 385/135–137, 147; 324/668; 359/124, 167, 173; 356/404; 358/512, 901.1

[56] References Cited

U.S. PATENT DOCUMENTS

| | | | |
|---|---|---|---|
| 4,907,280 | 3/1990 | Barney et al. | 382/323 |
| 5,329,292 | 7/1994 | Cohen | 359/124 |
| 5,416,872 | 5/1995 | Sizer II et al. | 385/92 |
| 5,418,466 | 5/1995 | Watson et al. | 324/668 |

*Primary Examiner*—Akm E. Ullah
*Attorney, Agent, or Firm*—Bell, Seltzer, Park & Gibson, P.A.

[57] ABSTRACT

A system and method to fanout, breakout and splice into optical fibers in a ribbon cable trunkline extending throughout an aircraft with optical minimal loss. Boxes are positioned at strategic locations along the aircraft's fiber optic trunkline. Within each box, one or more fanout cable assemblies are supported and terminated whereby the optical fibers in the ribbon cable are transitioned into individually jacketed fibers for connection to separate locations. When an optical fiber circuit needs to be broken out at the location of a particular box, the proper individually jacket fiber is cut and the end that results is permanently connected to a breakout connector, also positioned through the box, so that the optical circuit appears on the breakout connector outside the box where a mating connector can be used to further route the optical circuit being broken out.

20 Claims, 2 Drawing Sheets

OPTICAL RIBBON CABLE FANOUT BOXES

BACKGROUND OF THE INVENTION

Optical ribbon cables are now being contemplated for use in optical communications busses throughout aircraft. The use of optical communications throughout aircraft reduces weight when compared to conventional electrical wiring. Optical ribbon cable is comprised of multiple parallel optical fibers that are held planar to each other, the planar configuration having a common outer sheath for environmental protection. This allows the fibers to be held together reducing the volume and weight of the cable with respect to optical cable made from individually jacketed fibers.

During the development, production and modification of aircraft, it is often required that additional connections must be made to the communication busses that extend throughout the aircraft. When an electrical buss is used, techniques to splice into or reroute the wire of a communication channel of the buss are well developed. Aircraft are now being designed using a fiber optic trunkline usually formed using multi-fiber optical ribbon cable. Unfortunately, after the ribbon cable has been constructed, splicing into or breaking out a fiber from the middle thereof is difficult and labor intensive.

Various solutions that allow after manufacture changes to the configuration of fiber optic cables are shown in the prior art. For example, Brown in U.S. Pat. No. 3,902,786 discloses an optical access coupler. Nolf, et al. in U.S. Pat. No. 4,648,068 disclose a technique for protecting an optical fiber breakout one fiber at a time. Hogan, et al. in U.S. Pat. No. 5,109,467 disclose a cabinet in which optical fibers can be interconnected. Balow, et al. in U.S. Pat. No. 5,127,082 disclose a fiber optic patch panel. Bullock, et al. in U.S. Pat. No. 5,267,338 show a low profile cable having component breakouts there along. Karon in U.S. Pat. No. 5,394,502 shows a harness to support breakouts in a fiber optic cable. Dietz, Jr., et al. in U.S. Pat. No. 5,394,503 disclose an optical patch panel wherein the connection between optical fibers can be switched. Korkowski, et al. in U.S. Pat. No. 5,432,875 show a fiber optic connector module, which has beam splitters incorporated therein.

Renichi Wuguchi, et al. in Japanese application 61-283669 published Oct. 20, 1988 disclose a fiber optic breakout box with a pair of optical line connectors and a breakout connector mounted thereto for connection to external optical cables. Optical patch cords having connectors on the opposite ends thereof, are used inside the box to make or break connections between the line connectors and the breakout connector to establish the desired optical circuits and to allow the connections to be modified in the field.

As mentioned above, a major disadvantage of ribbon cable is that once it is constructed, it is very difficult to tap into an individual fiber or provide a ribbon cable connector that can provide connection to individually jacketed fibers. Berg Electronics, Inc. sells a specially designed high temperature fanout cable that is formed into a ribbon cable on one end and consists of individually jacked fibers on the other, but without additional structure, it is not reliable in an aircraft environment.

BRIEF DESCRIPTION OF THE INVENTION

The present invention provides the ability to fanout, breakout and splice into optical circuits in a trunkline extending throughout an aircraft with minimal loss. The present invention utilizes the Berg fanout cable to provide optical fiber fanouts and breakouts capable of reliable operation in a commercial or military environment. Protective boxes for the Berg cable are positioned at strategic locations along the aircraft's fiber optic trunkline located along the longitudinal axis of an aircraft. The trunkline is usually constructed using a plurality of multi-fiber ribbon cable segments. Conventional ribbon cable connectors, such as those known as AVMAC available from Berg Electronics, are attached to each end of a ribbon cable segment. Mating fixed AVMAC connectors extend through opposite sides of protective box. Within the box, the Berg fanout cable is used to convert the fibers from a ribbon configuration to a loose bundle of individually jacketed fibers which are supported by the box. The individually jacketed fibers are then terminated in a conventional individual fiber fanout connector from which individual optical circuits can be run using one or more suitable plugs. By using the same configuration either in two connected protective boxes connected back to back or two cables connected together with a fanout connector and fanout plug in a single box, breakout of optical circuits is possible in the field. Permanent optical connections are preferred because they minimize optical loss and increase reliability.

In either box, the individually jacked fibers preferably are substantially longer than the spacing between the ribbon cable connectors and the fanout connectors or plugs and are formed in multiple turn loops supported by the box. This provides extra fiber length to allow after manufacture change and/or repair. In applications where repair and modification is not a concern, the loops may be eliminated to reduce weight, size and complexity of the invention.

In the breakout box configuration, two or more breakout connectors are provided through the box. When an optical fiber circuit needs to be broken out at the location of a particular box, the proper fiber in the fanout cable is cut adjacent an interior fanout connector and the end that results is permanently connected to a breakout connector so that the optical circuit appears on the connector outside the box where a mating plug can be used to further route the optical circuit. The loop provides enough slack to reach the proper breakout connector and still have extra length for additional modification or repair. The interior side of the breakout connector may be of any suitable configuration that allows manual permanent fiber connection thereto. The exterior of the breakout connector, however, preferably is of a standard fiber optic cable configuration allowing the circuits that are broken out to be easily connected to various optical components.

Therefore, the present fanout and breakout boxes allows optical circuits to be fanned out and/or permanently rerouted within the confines of an aircraft with minimal optical power loss. Little optical penalty results because normally the routing of optical cable within an aircraft requires numerous cable segments anyhow that need to be connected together to accommodate installation and repair, and the boxes can be positioned to also fill that purpose.

Therefore, it is an object of the present invention to provide economical means that allow fanouts and breakouts from optical ribbon cables used as multi-channel optical trunklines in aircraft.

Another object is to provide means that allow commercially available ribbon-to-separate fiber fanout cables to be used in an aircraft or other harsh environment, which minimizes the optical loss therein.

Another object is to provide an optical cable fanout or breakout box having low optical loss so that a multiplicity of the boxes may be positioned along an optical trunkline in an aircraft without requiring excessive power or amplifiers there along.

These and other objects and advantages of the present invention will become apparent to those skilled in the art after considering the following detailed specification, together with accompanying drawing wherein:

DETAILED DESCRIPTION OF THE SHOWN EMBODIMENT

Figure 1:
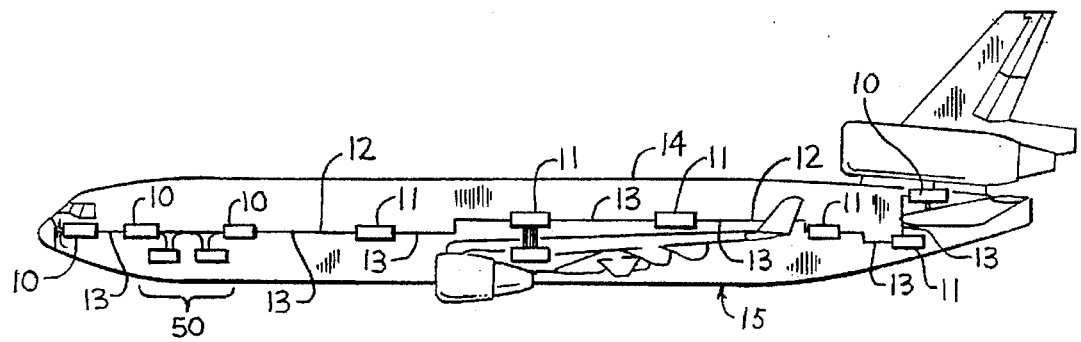
FIG. 1 is a diagrammatic side elevational view of an aircraft having an optical trunkline that includes fanout and breakout boxes constructed according to the present invention strategically positioned there along.

Referring to the drawing more particularly by reference numbers, numbers 10 and 11 in FIG. 1 refer to fanout and breakout boxes positioned along an optical trunk line 12 made up of a plurality of ribbon cables segments 13, which extend longitudinally along the fuselage 14 of an aircraft 15.

Figure 2:
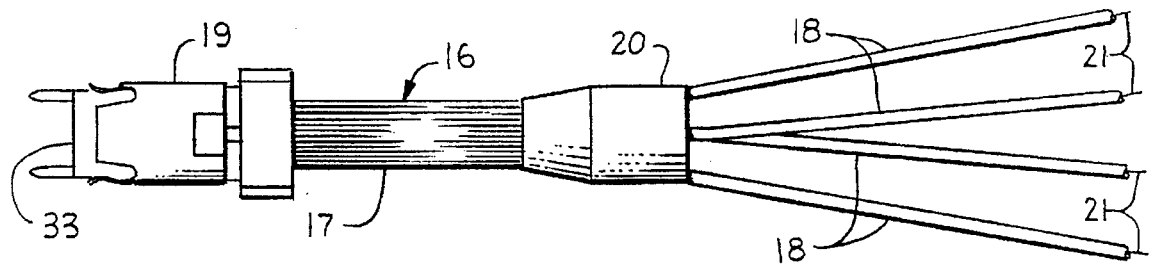
FIG. 2 is an enlarged detail view of a commercially available fanout cable.

A Berg Electronics fanout cable assembly 16 is shown in FIG. 2. Such cables are used in the communications industry to fanout a ribbon cable 17 into individual separately jacketed optical fiber cables 18. The fanout cable assembly 16 also includes a ribbon cable connector 19, such as an AVMAC connector, for connecting the ribbon cable 17 to other ribbon cable and a transition portion 20 where individual fibers 21 of the ribbon cable 17 are fanned out, individually jacketed, and potted.

Figure 3:
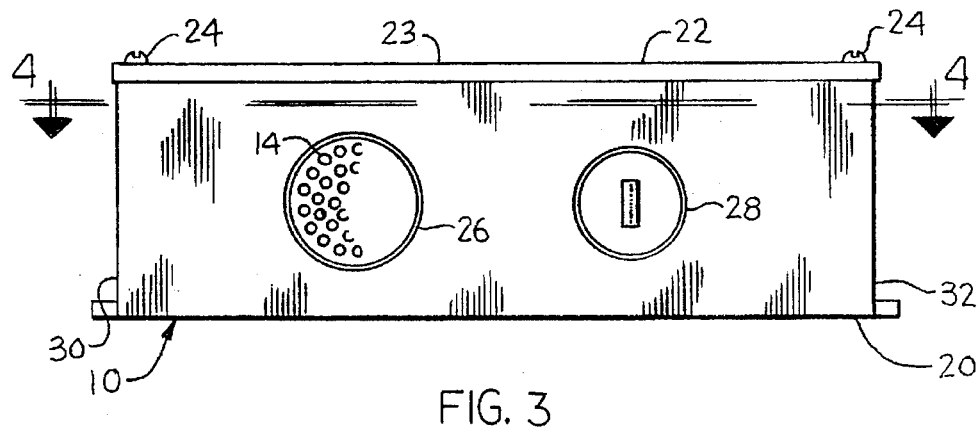
FIG. 3 is a side view of a fanout box of the present invention with ribbon cable connected to one side thereof and individually jacketed fibers connected to the other side thereof.
Figure 4:
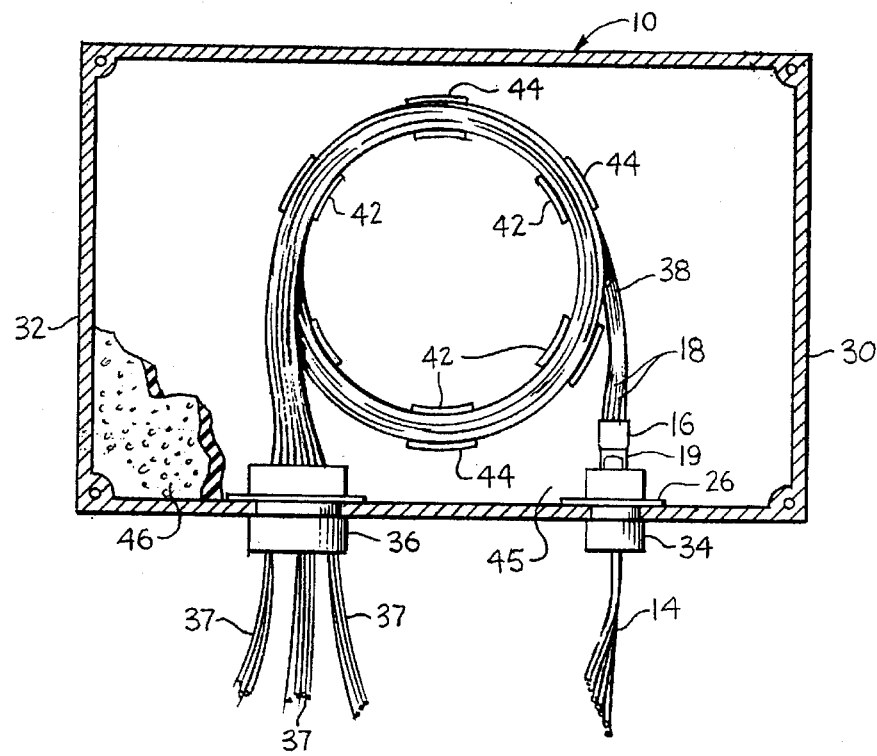
FIG. 4 is a cross-sectional view taken at line 4—4 of the fanout box of FIG. 3 showing the internal configuration thereof.

As shown in FIGS. 3 and 4, the fanout box 10 includes a container 22 closed by a cover 23 held in place by suitable fasteners 24. An optical ribbon cable connector 26 and an optical fanout connector 28 are provided at the opposite ends 30 and 32 of the container 22. The optical ribbon cable connector 26 is attached to the end 33 of the ribbon connector 19 inside the box 10 and to a plug 34 for a ribbon cable segment 14 outside the box 10. The optical fanout connector 28 is connected to the fiber cables 18 inside the box 10 and is designed to mate with a conventional optical plug 36 for individually jacketed fibers 37 outside the box 10. The optical loss between the connectors 26 and 28, and the plugs 34 and 36 can be very low. The cables 18 are loosely formed into a bundle 38 and the bundle 38 is formed into a multi-turn loop 40 to provide enough slack for repair should a cable 18 break.

The loop 40 is restrained by inner and outer arcuate guides 42 and 44 which are upstanding from the base 45 of the box 10. The guides 42 and 44 assure that the cables 18 maintain more than a minimum radius to prevent sharp bends that could adversely affect light passing therethrough or break the fibers 21. When the box 10 is to be used in particularly harsh environments, the interior of the box 10 can be foamed to immobilize the cables 21. The guides 42 and 44 prevent the undesired movement of the cables 21 during the foaming process. When the cables 18 are potted in foam 46, the ease of modification and/or repair is reduced. Also, in applications where repair an modification is not a concern, the loop 40 can be eliminated, leaving just enough slack for assembly and the box 10 narrowed to save weight and volume.

Figure 5:
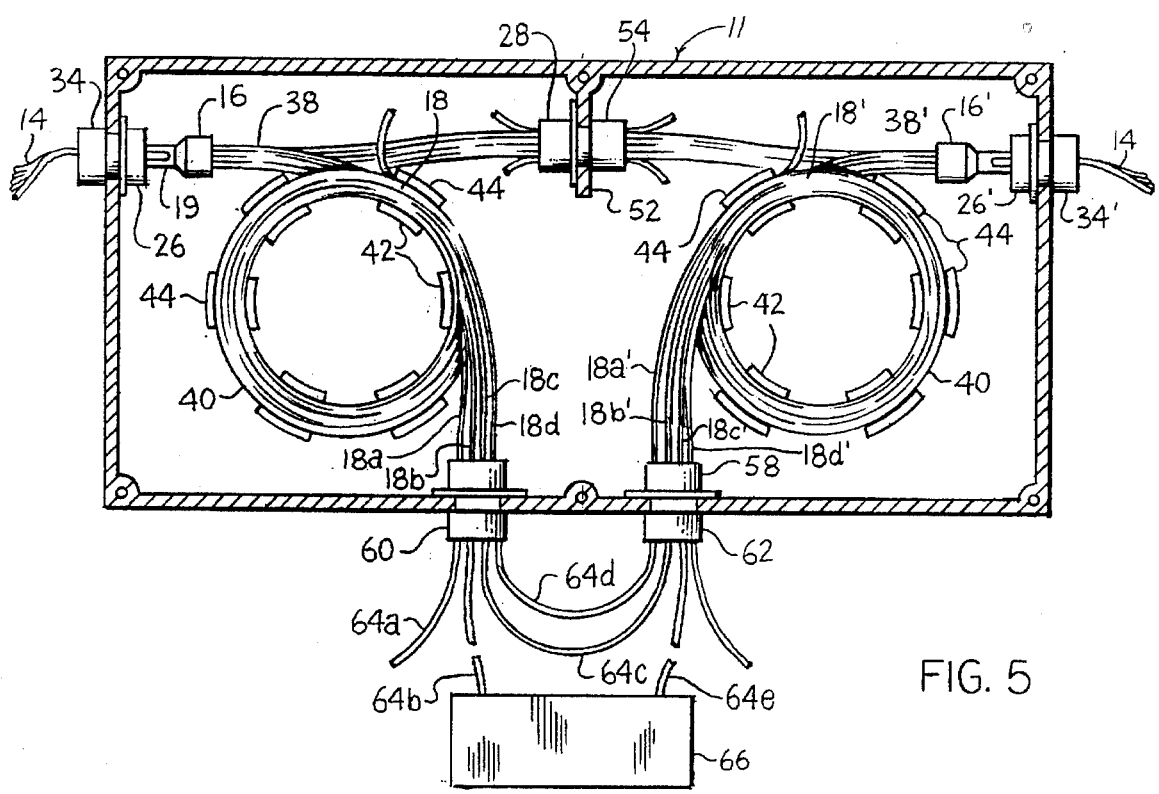
FIG. 5 is a cross-sectional view similar to FIG. 4 of a breakout box.

As shown in FIG. 1, two fanout boxes 10 can be combined to provide an optical breakout 50 or as shown in FIG. 5, the structures of two fanout boxes can be configured into the breakout box 11. The breakout box 11 includes fanout cable assemblies 16 and 16' whose bundles 38 and 38' of separate fibers cables 18 and 18' are formed into loops 40 and 40' restrained between inner and arcuate guides 42 and 44. The connector 28 into which fanout cable assembly 16 is terminated is mounted through an interior wall 52 where it can mate with an optical plug 54 that terminates the cables 18' of fanout cable assembly 16' individual cables 18 and 18' can be cut from connectors 28 and 54 and terminated in breakout connectors 56 and 58, shown as ends 18a, 18b, 18c and 18d, for connector 56 and ends 18a', 18b', 18c', and 18d' for connector 58. Conventional optical plugs 60 and 62 can then be used to connect the output cables 64a, 64b, 64c, 64d, 64e and 64f. As shown cables 64b and 64e are input and output cables to device 66, whereas cables 64c and 64d are shunts used when it is desired to reestablish an optical circuit outside the box 11 that has been interrupted inside the box 11.

The breakout box 11 can be configured as shown in FIG. 5 during manufacture and yet provide the versatility to allow changes to accommodate changes in the configuration of the aircraft 15.

Thus, there has been shown and described a novel optical fanout and breakout boxes specifically for use in aircraft where minimal optical loss is required and, in most cases, few changes are needed during the lifetime of the aircraft so that permanent connections are desired, which fulfill all of the objects and advantages sought therefor. Many changes, alterations, modifications and other uses and applications of the subject boxes will become apparent to those skilled in the art after considering the specification together with the accompanying drawings. All such changes, alterations and modifications which do not depart from the spirit and scope of the invention are deemed to be covered by the invention which is limited only by the claims that follow.

I claim:

1. A device to convert optical ribbon cable into individual cables for use in aircraft having:
    a first optical fanout cable assembly having:
        a first ribbon cable end;
        a first fanout end consisting of:
            first separately jacketed optical fibers; and
        a first transition portion between said first ribbon cable end and said first fanout end;
    a first ribbon cable connector at which said first ribbon cable end is connected;
    a fanout connector at which at least some of said first separately jacketed optical fibers are connected; and
    an enclosure in which said first optical fanout cable assembly is mounted, said enclosure having:
        walls, said first ribbon cable connector being mounted through an enclosure wall and said fanout connector being mounted through an enclosure wall.

2. The device to convert optical ribbon cable into individual cables for use in aircraft as defined in claim 1 wherein said enclosure includes:
    a box having:
        an inside;
        an outside;

an access extending from said inside to said outside; and a cover for closing said access.

3. The device to convert optical ribbon cable into individual cables for use in aircraft as defined in claim 2 wherein said first fanout end is formed into a multi-turn loop.

4. The device to convert optical ribbon cable into individual cables for use in aircraft as defined in claim 3 wherein said box includes:

first inner arcuate segments extending in said inside of said box; and first outer arcuate segments extending in said inside of said box spaced from said first inner arcuate segments with said multi-turn loop supported therebetween.

5. The device to convert optical ribbon cable into individual cables for use in aircraft as defined in claim 4 wherein said multi-turn loop is potted in place.

6. The device to convert optical ribbon cable into individual cables for use in aircraft as defined in claim 1 further including:

a second optical fanout cable assembly mounted in said enclosure having:
a second ribbon cable end;
a second fanout end consisting of:
second separately jacketed optical fibers; and
a second transition portion between said second ribbon cable end and said second fanout end;
a second ribbon cable connector at which said second ribbon cable end is connected; and
a fanout plug at which at least some of said second separately jacketed optical fibers are connected, said fanout plug being connected to said fanout connector, said second ribbon cable connector being mounted through an enclosure wall.

7. The device to convert optical ribbon cable into individual cables for use in aircraft as defined in claim 6 further including:

a breakout connector mounted through an enclosure wall, wherein at least one of said separately jacketed optical fibers is permanently connected to said breakout connector.

8. The device to convert optical ribbon cable into individual cables for use in aircraft as defined in claim 6 further including:

a first breakout connector mounted through an enclosure wall, wherein at least one of said first separately jacketed optical fibers is fixedly connected to said first breakout connector, and a second breakout connector mounted through an enclosure wall, wherein at least one of said second separately jacketed optical fibers is fixedly connected to said second breakout connector.

9. The device to convert optical ribbon cable into individual cables for use in aircraft as defined in claim 8 wherein said first fanout end is formed into a first multi-turn loop, and said second fanout end is formed into a second multi-turn loop.

10. The device to convert optical ribbon cable into individual cables for use in aircraft as defined in claim 9 wherein said enclosure includes:

first inner arcuate wall segments extending in said inside of said enclosure;

first outer arcuate wall segments extending in said enclosure spaced from said first inner arcuate wall segments with said first multi-turn loop supported therebetween;

second inner arcuate wall segments extending in said inside of said enclosure; and second outer arcuate wall segments extending in said enclosure spaced from said second inner arcuate wall segments with said second multi-turn loop supported therebetween.

11. The device to convert optical ribbon cable into individual cables for use in aircraft as defined in claim 10 wherein said first and second multi-turn loops are potted in place.

12. A method for providing reliable individual optical circuit access to optical fibers in an optical ribbon cable in a harsh vibratory environment including:

providing a container having:
an inside;
an outside; and
a first access port extending from the inside to the outside;

providing a first fanout cable assembly having:
a plurality of optical fibers;
a first end adapted to connect to an optical ribbon connector; and
a second end where the optical fibers are individually jacketed;

providing a first optical connector attached to the container extending from the inside to the outside of the container through the first access port, the first optical connector having:
a first outer portion adapted to removably connect to a ribbon connector plug; and
a first inner portion adapted for connection to the first end of the first fanout cable assembly; and providing a second optical connector attached to the container, the second optical connector having:
a second outer portion adapted to removably connect to at least one optical plug; and
a second inner portion adapted for permanent optical connection to at least some of the plurality of the individually jacketed optical fibers.

13. The method as defined in claim 12 further including:

providing a second access port through the container; and providing at least one breakout optical connector positioned through the second access port having:
a breakout outer portion adapted to removably connect to at least one optical fiber; and
a breakout inner portion adapted for fixed optical connection to at least one of the individually jacketed optical fibers.

14. The method as defined in claim 13 further including:

coiling the separately jacketed optical fibers into a coil; and supporting the coiled separately jacketed optical fibers in the container.

15. The method as defined in claim 12 further including:

providing a second access port;

providing a second fanout cable assembly having:
a plurality of optical fibers;
a first end adapted to connect to an optical ribbon connector; and
a second end where the optical fibers are individually jacketed;

providing a third optical connector attached to the container extending from the inside to the outside of the container through the second access port, the third optical connector having:

a third outer portion adapted to removably connect to a ribbon connector plug; and a third inner portion adapted for connection to the first end of the second fanout cable assembly; and providing an optical plug adapted for mating with the second optical connector, the plug being fixedly connected to at least some of the plurality of individually jacketed optical fibers at the second end of the second fanout cable assembly;

coiling the separately jacketed optical fibers of the first and second fanout cable assemblies into first and second coils;

providing a third access through the container;

providing a first breakout optical connector positioned through the third access;

cutting at least one individually jacketed optical fiber adjacent the second optical connector to form at least one breakout end extending from the first coil; and fixedly connecting the at least one breakout end to the first breakout optical connector.

16. The method as defined in claim 15 further including:

providing a fourth access through the container;

providing a second breakout optical connector positioned through the fourth access;

cutting at least one individually jacketed optical fiber adjacent the optical plug to form at least one breakout end extending from the second coil; and fixedly connecting the at least one breakout end to the second breakout optical connector.

17. A device for providing reliable individual optical circuit access to optical fibers in an optical ribbon cable in a harsh vibratory environment including:

a container having:
an inside;
an outside; and
a first access port extending from said inside to said outside;

a first fanout cable assembly having:
a plurality of optical fibers;
a first end adapted to connect to an optical ribbon connector; and
a second end where said plurality of optical fibers are individually jacketed;

a first optical connector attached to said container extending from said inside to said outside of said container through said first access port, said first optical connector having:
a first outer portion adapted to removably connect to a ribbon connector plug; and
a first inner portion adapted for connection to said first end of said first fanout cable assembly; and a second optical connector attached to said container, said second optical connector having:
a second outer portion adapted to removably connect to at least one optical plug; and
a second inner portion adapted for permanent optical connection to at least some of said plurality of the individually jacketed optical fibers.

18. The device as defined in claim 17 further including:

a second access port through said container; and at least one breakout optical connector positioned through said second access port having:
a breakout outer portion adapted to removably connect to at least one optical fiber; and
a breakout inner portion adapted for fixed optical connection to at least one of said individually jacketed optical fibers.

19. The device as defined in claim 17 further including:

a second access port;

a second fanout cable assembly having:
a plurality of optical fibers;
a first end adapted to connect to an optical ribbon connector; and
a second end where said optical fibers are individually jacketed;

a third optical connector attached to said container extending from said inside to said outside of said container through said second access port, said third optical connector having:
a third outer portion adapted to removably connect to a ribbon connector plug; and
a third inner portion adapted for connection to said first end of said second fanout cable assembly; and an optical plug adapted for mating with said second optical connector, said plug being fixedly connected to at least some of said plurality of individually jacketed optical fibers at said second end of said second fanout cable assembly;

a third access through said container; and a first breakout optical connector positioned through said third access, wherein at least one individually jacketed optical fiber is fixedly connected to said first breakout optical connector.

20. The device as defined in claim 17 further including:

a second access port;

a second fanout cable assembly having:
a plurality of optical fibers;
a first end adapted to connect to an optical ribbon connector; and
a second end where said optical fibers are individually jacketed;

a third optical connector attached to said container extending from said inside to said outside of said container through said second access port, said third optical connector having:
a third outer portion adapted to removably connect to a ribbon connector plug; and
a third inner portion adapted for connection to said first end of said second fanout cable assembly; and an optical plug adapted for mating with said second optical connector, said plug being fixedly connected to at least some of said plurality of individually jacketed optical fibers at said second end of said second fanout cable assembly;

a third access through said container;

a first breakout optical connector positioned through said third access, wherein at least one individually jacketed optical fiber of said first fanout cable assembly is fixedly connected to said first breakout optical connector;

a fourth access through said container; and a second breakout optical connector positioned through said fourth access, wherein at least one individually jacketed optical fiber of said second fanout cable assembly is fixedly connected to said second breakout optical connector.

* * * * *